(12) United States Patent
Nelson

(10) Patent No.: US 6,753,860 B2
(45) Date of Patent: *Jun. 22, 2004

(54) TILE-BASED DIGITAL DIFFERENTIAL ANALYZER RASTERIZATION

(75) Inventor: Scott R. Nelson, Pleasanton, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/359,897

(22) Filed: Feb. 6, 2003

(65) Prior Publication Data

US 2003/0137514 A1 Jul. 24, 2003

Related U.S. Application Data

(63) Continuation of application No. 09/675,353, filed on Sep. 29, 2000, now Pat. No. 6,556,203, which is a continuation-in-part of application No. 09/608,414, filed on Jun. 30, 2000, now Pat. No. 6,636,218.

(51) Int. Cl.[7] .............................................. G06T 11/20
(52) U.S. Cl. ...................................... 345/441; 345/419
(58) Field of Search ................................. 345/441, 419, 345/501, 443

(56) References Cited

U.S. PATENT DOCUMENTS

| | | | | |
|---|---|---|---|---|
| 5,307,449 A | * | 4/1994 | Kelley et al. ................ 345/419 |
| 5,446,836 A | * | 8/1995 | Lentz et al. ................. 345/441 |
| 5,528,737 A | * | 6/1996 | Sfarti .......................... 345/441 |
| 5,544,294 A | * | 8/1996 | Cho et al. .................... 345/441 |
| 5,684,941 A | * | 11/1997 | Dye ............................. 345/441 |
| 5,982,384 A | * | 11/1999 | Prouty et al. ............... 345/441 |
| 6,072,505 A | * | 6/2000 | Piazza et al. ............... 345/501 |
| 6,285,376 B1 | * | 9/2001 | Choi et al. .................. 345/441 |
| 6,421,053 B1 | * | 7/2002 | Johns et al. ................ 345/441 |

* cited by examiner

*Primary Examiner*—Michael Razavi
*Assistant Examiner*—Ryan Yang
(74) *Attorney, Agent, or Firm*—Libby H. Hope (57) ABSTRACT

A method, apparatus, and system are described for rasterizing a triangle. Pixel parameter values are interpolated by adding or subtracting a vertical delta and/or by adding or subtracting a horizontal delta within a 4×4 tile of 16 pixels.

10 Claims, 11 Drawing Sheets

TILE-BASED DIGITAL DIFFERENTIAL ANALYZER RASTERIZATION

This application is a continuation of U.S. patent application Ser. No. 09/675,353, filed Sep. 29, 2000, now U.S. Pat. No. 6,556,203, issued on Apr. 29, 2003, entitled "Tile-Based Digital Differential Analyzer Rasterization," which is a continuation-in-part (CIP) of U.S. patent application Ser. No. 09/608,414, filed Jun. 30, 2000, now U.S. Pat. No. 6,636,218, issued on Oct. 21, 2003, entitled "Tile-Based Digital Differential Analyzer Rasterization".

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates to the field of computer graphics, and more specifically, to rasterization using a tile-based digital differential analyzer algorithm.

BACKGROUND OF THE INVENTION

Generally, the field of three-dimensional (3D) computer graphics is concerned with generating and displaying 3D objects in a two-dimensional (2D) space, such as a display screen. This is accomplished by converting information about 3D objects into a bit map that is displayed. This process is called rendering, a multi-part process by which a computer turns an application model description of an image into a screen image. The basic idea is that the processing of information in three-dimensional computer graphics occurs in a series of stages in a graphics pipeline, where each stage generates results for a successive stage.

The process starts with an application model for describing an object using three-dimensional coordinates (x, y, z), where the object is defined by large numbers of basic geometrical shapes called primitives that define the shape of components of the object. Examples of primitives that make up an object include a triangle, line, dot, circle, ellipse, arc, text, polyline, and polygon. In addition to primitives, an application model stores object attributes such as size, color, line, width, and surface texture, as well as connectivity relationships and positioning data that describe how the components fit together.

The application model for a given object is created by an application program, and stored in an application database. Using a graphics API (application programming interface), a series of graphics output commands that contain both a detailed geometric description of what is to be viewed and the attributes describing how the objects should appear, the application program converts the application model to a sequence of commands, which are then processed by a graphics pipeline to generate a view of the model. The graphics API typically consists of a set of output subroutines corresponding to the various primitives, attributes, and other elements, which are all collected in a graphics package that can be called from high-level languages such as C, Pascal, or LISP.

The basic element of any graphics system is rasterization, the process by which a primitive is converted to a two-dimensional image on a raster device. A raster device, such as a computer monitor, comprises a raster, the rectangular area of a display screen actually used to display images. A raster is itself made up of pixels, short for picture elements, the smallest units by which a primitive can be represented on a display. Pixels are activated on a raster device as an electron beam sweeps across the device to generate a picture one scan line at a time.

During rasterization, a primitive that is defined by 3D parameters in a three-dimensional (3D) representation is transformed into a two-dimensional raster of pixels. 3D parameters comprise x, y, and z coordinates, and may optionally comprise parameters such as color, and texture. During the transformation process, a 3D coordinate comprising an X, Y, and Z value is transformed into an X and Y screen coordinate used for positioning, and a Z, or depth value, that is treated as a parameter.

During rasterization, a set of parameter values are given for each of the three triangle vertices. One of the problems to be solved during the rasterization process is computing the 3D parameters, such as the Z parameter, color parameter, and texture parameter, corresponding to the coordinates in order to most closely approximate the three-dimensional primitive. Rasterization, which is also known as scan conversion, makes these determinations by computing the parameter values at each pixel while scanning the horizontal or vertical scan lines of the pixel grid.

The rasterization process can be a costly and inefficient process, sometimes requiring many multiplication computations. While several algorithms exist, the process is commonly the subject of optimization algorithms.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

According to one aspect of the invention, a rasterization method to convert geometric values of a triangle to pixels is described. A triangle is rasterized by determining the boundaries of a triangle on a grid, finding valid pixel samples, and calculating their values by interpolating down the vertical axis of a triangle and across the horizontal axis of the triangle within a block of pixels.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium includes any mechanism for storing or transmitting information in a form readable by a machine (e.g., a computer). For example, a machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

In rasterization, x and y define the triangle in screen space, with all the other parameters being interpolated to find their values at a specific point in screen space. There are two major parts to a rasterization process: edge interpolation, where the x and y coordinates of valid sample points (i.e., pixels which fall inside of the primitive boundaries) are determined; and pixel parameter computation, where parameters corresponding to the x and y coordinates are interpolated.

i740 Tile-Based Rasterization

A scan conversion technique used in the Intel i740 graphics processor scan converts a primitive block, also known as a tile, at a time rather than a pixel at a time. Pixels are grouped into tiles, such as a 4×4 tile of 16 pixels. Starting from a first tile, valid pixels are found within the first tile. Once the tile is completed, a next tile is evaluated. Tile-based rasterization is computed as follows:

1. Compute the bounding box of the triangle.
2. Locate the top-most vertex, start span (ss), and reference point (the center) of the top left pixel in ss.
3. Normalize the parameters.
4. Compute the area of the triangle using the determinant of the matrix:

$$a = \begin{vmatrix} 1 & 1 & 1 \\ x0 & x1 & x2 \\ y0 & y1 & y2 \end{vmatrix}$$

5. Perform face culling using a, where the triangle is culled if a<=0 for counterclockwise triangles, and a>=0 for clockwise triangles.
6. Locate the top-most vertex, and rotate the vertices counterclockwise.
7. Compute the three edge equations as follows:

$$L0 = Lx*X + Ly*Y$$

where $Lx = \text{delta}X * \text{manDistRecip};$ $Ly = \text{delta}Y * \text{manDistRecip}$ $\text{delta}X = X1 - X0;$ $\text{delta}Y = Y1 - Y0;$ $\text{manDist} = \text{abs}(\text{delta}X) + \text{abs}(\text{delta}Y);$ $\text{manDistRecip} = 1.0/\text{manDist}.$ 8. Compute the parameter plane equation as follows:

$$P0 = C0 + C1*x0 + C2*y0$$

$$P1 = C0 + C1*x1 + C2*y1$$

$$P2 = C0 + C1*x2 + C2*y2$$

Using Cramer's rule, the coefficients for the plane equation can be computed as follows:

$$C_0 = \frac{\begin{vmatrix} p_0 & p_1 & p_2 \\ x_0 & x_1 & x_2 \\ y_0 & y_1 & y_2 \end{vmatrix}}{a}$$

$$C_1 = \frac{\begin{vmatrix} 1 & 1 & 1 \\ p_0 & p_1 & p_2 \\ y_0 & y_1 & y_2 \end{vmatrix}}{a}$$

$$C_2 = \frac{\begin{vmatrix} 1 & 1 & 1 \\ x_0 & x_1 & x_2 \\ p_0 & p_1 & p_2 \end{vmatrix}}{a}$$

Rather than generate all of the pixels to be rendered, a scan conversion unit first generates all of the blocks overlapped by the triangle as follows:

1. Locate the block containing the top vertex, and mark this as the start position.
2. Scan left until the termination condition is true.
   Termination condition means a) the bounding box of the triangle has been exceeded; b) the center of the block is more than k/2 negative units away from one of the edges (i.e., there is one edge whose distance function evaluated at the center of the block is less than −k/2).
3. Go back to the start position and scan right until the termination condition is true.
4. Set the new start position to the ideal place to start the scan in the next line, and continue processing at 1.
   Ideal place to start the scan on the next line is the block whose bottom center is closest to the center of the triangle. This is done by tracking the block with the maximum of minimum distance to all three edges.

Once a block is generated, the distance functions for the edges are used to determine if a pixel is inside the triangle. All three distance functions have to be positive (or all three negative) for a pixel to lie inside the triangle. The distance functions can be evaluated using direct evaluation or interpolation The same thing applies to the generation of the parameters for the pixels. In i740, the parameter value for the top most pixel is directly evaluated using the plane equations for the parameter while the other pixels in the block are interpolated. To avoid having to scan through every pixel in the block (if any are visible), i740 stores multiple interpolation step sizes in both x and y. (If pixel n is visible, n+1 is not, and n+2 is, then the parameter value for n+2 can be interpolated by adding the stored two step value rather than require n+1 to be interpolated first).

DDA Rasterization

Figure 1:
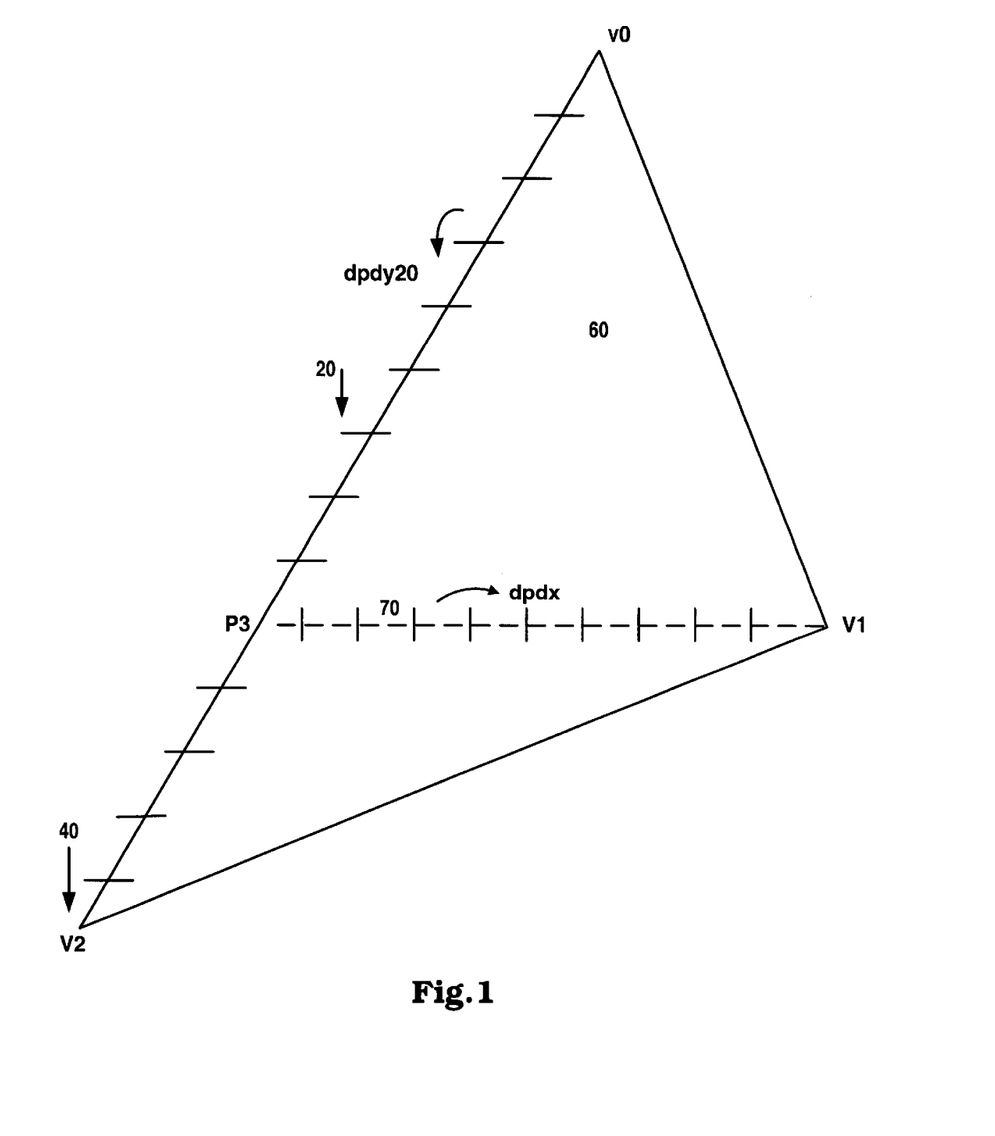
FIG. 1 illustrates a triangle primitive and boundaries.

Traditionally, a triangle is rasterized by interpolating down the triangle edges to each scan line, finding the first valid pixel on that scan line, and determining that pixel's value (x, y, z, color, texture, etc.). The next pixel's value on that scan line is determined by stepping across the x axis one pixel at a time (step value in the x direction), and then computing each pixel's value on that scan line. This method is known as the digital differential analyzer (hereinafter "DDA") method. The step value for each parameter in the y direction down the longest edge of the triangle, and in the x direction are determined through setup calculations. In reference to FIG. 1, the setup computation in DDA is determined as follows:

1. Calculate parameter deltas dpdy20 for stepping down the longest edge of the triangle.

Determine the longest edge.
   Sort the given vertices in top to bottom order, and label them: V0, V1, V2
   Using the y coordinates of the vertices, calculate the vertical lengths between vertices, where Lab represents the length from vertex a to vertex b.

L02=12.75

L01=7.25

L12=5.5

In this example, the edge from vertex 2 to vertex 0 is the longest vertical edge of the triangle.

Calculate parameter values at first scan line below v0 on the longest vertical edge of the triangle (p02[i]), where i represents a given one of one or more parameters.

$p02[i]=v0.v[i]+yOff0*dpdy20[i]$, where i={z, texture, color, etc.}

Determine the parameter delta (dpdy20), i.e. the amount by which a parameter will change when stepping down the longest vertical edge of the triangle by one scan line.

$dx20=v2.v[PVERT\_X]-v0.v[PVERT\_X]$;

where v2.v[PVERT_X] is the x coordinate at vertex 2, and
   v0.v[PVERT_X] is the x coordinate at vertex 0.

$dy20=v2.v[PVERT\_Y]-v0.v[PVERT\_Y]$;

$rdy20=1/dy20$;

$dp20=v2.v[i]-v0.v[i]$;

$dpdy20[i]=dp20*rdy20$;

Determine X start point for longest edge.
   Determine offset (yoff) from y-coordinate at V0.

$yoff=v0.v[PVERT\_Y]-y02$

2. Calculate the parameter delta dpdx, i.e., the amount by which given parameter i will change when stepping across the horizontal axis.

Compute distance across the widest part of the triangle (dx13).

$p3Ratio=dy21*rdy20$;

where $dy21=v2.v[PVERT\_Y]-v1.v[PVERT\_Y]$ and $rdy20=1/dy20$;

$xAtP3=v2.v[PVERT\_X]-p3Ratio*dx20$;

$dx13=xAtP3-v1.v[PVERT\_X]$

Determine if the triangle is scanned to the left or to the right. If dx13<0.0, then the triangle is scanned to the right. Otherwise, the triangle is scanned to the left.

Divide the distance by the number of steps (pixels).

$rdx13=1.0f/dx13$;

$pAtP3[i]=v2.v[i]-p3Ratio*dp20[i]$;

$dp13[i]=v1.v[i]-pAtP3[i]$;

$dpdx[i]=dp13[i]*rdx13$;

3. Determine triangle boundaries.

Compute all the edge slopes. The other parameters are not needed for the other two edges, since it only needs to know when to stop stepping across the scan line.

$dx01=v0.v[PVERT\_X]-v1.v[PVERT\_X]$;

where v0.v[PVERT_X] is the x coordinate at vertex 0, and
   v1.v[PVERT_X] is the x coordinate at vertex 1.

$dy01=v0.v[PVERT\_Y]-v1.v[PVERT\_Y]$;

$rdy01=1/dy01$;

$dxdy01=dx01*rdy01$;

$m01=1/dxdy01$ $dx12=v1.v[PVERT\_X]-v2.v[PVERT\_X]$;

where v1.v[PVERT_X] is the x coordinate at vertex 1, and
   v2.v[PVERT_X] is the x coordinate at vertex 2.

$dy12=v1.v[PVERT\_Y]-v2.v[PVERT\_Y]$;

$rdy12=1/dy12$;

$dxdy12=dx12*rdy12$;

$m12=1/dxdy12$

Compute initial X value for each of the edges, where the initial X value is the value at the first scan line below the top vertex.

4. At the beginning of triangle processing, the starting values of the long edge, and the starting values of the first short edge are loaded. The step values for calculating the pixel values (dpdy20, dpdx) are also loaded. Starting at first scan line below the V0, step across current scan line and compute pixel values.

Adjust p02[i] by distance on horizontal axis from point on edge of triangle to nearest pixel sample point.

Multiply parameter values p02[i] on longest edge of the triangle on the first scan line by step value dpdx until the right edge of the triangle is reached (as determined by the slope of the right edge).

5. Start next scan line by stepping down long edge of triangle by multiplying current parameter value by dpdy20.

6. Finally, the count representing the remaining length of the opposite edge is decremented by one. If the result is greater than 0, processing continues as described above. If the result is 0, then the edge parameters and initial values for the second edge are loaded, and processing for the second edge is initiated as described above for the first edge. When the count reaches 0 for the second edge, the triangle has been rasterized, and another triangle can be loaded.

While tile-based rasterization, such as that done by the i740 graphics chip, makes it easy to find the parameter values, the computations required to determine the boundaries of the triangle are rather complex. On the other hand, while the DDA method described above is simple, it requires a multiplication operation for each parameter on each scan line, requiring more processor power, and more hardware.

In tile-based DDA rasterization of the present invention, valid pixels are determined by finding the boundaries of a triangle within a pre-specified scan line region, and then finding all the valid pixels one grid at a time within that region. Values for pixels are computed by interpolating down the vertical axis of a triangle to each scan line in the y direction (rather than down the longest edge of the triangle), and stepping across the x axis one pixel at a time in the x direction within a tile (rather than across an entire scan line), where a tile comprises a predetermined block of pixels. Depending on how much parallelism is in the tile rasterization hardware, either all pixel values within a tile can be computed first, and then the valid pixels selected, or pixels can first be checked for validity, and their values computed only if they are valid samples. In preferred embodiments, a scan line region comprises 4 scan lines, and a tile comprises a 4×4 block of 16 pixels.

The step value for each parameter down the vertical axis of the triangle in the y direction, and across the horizontal axis of the triangle in the x direction are both determined through setup computations.

Set-Up Computations

Figure 2:
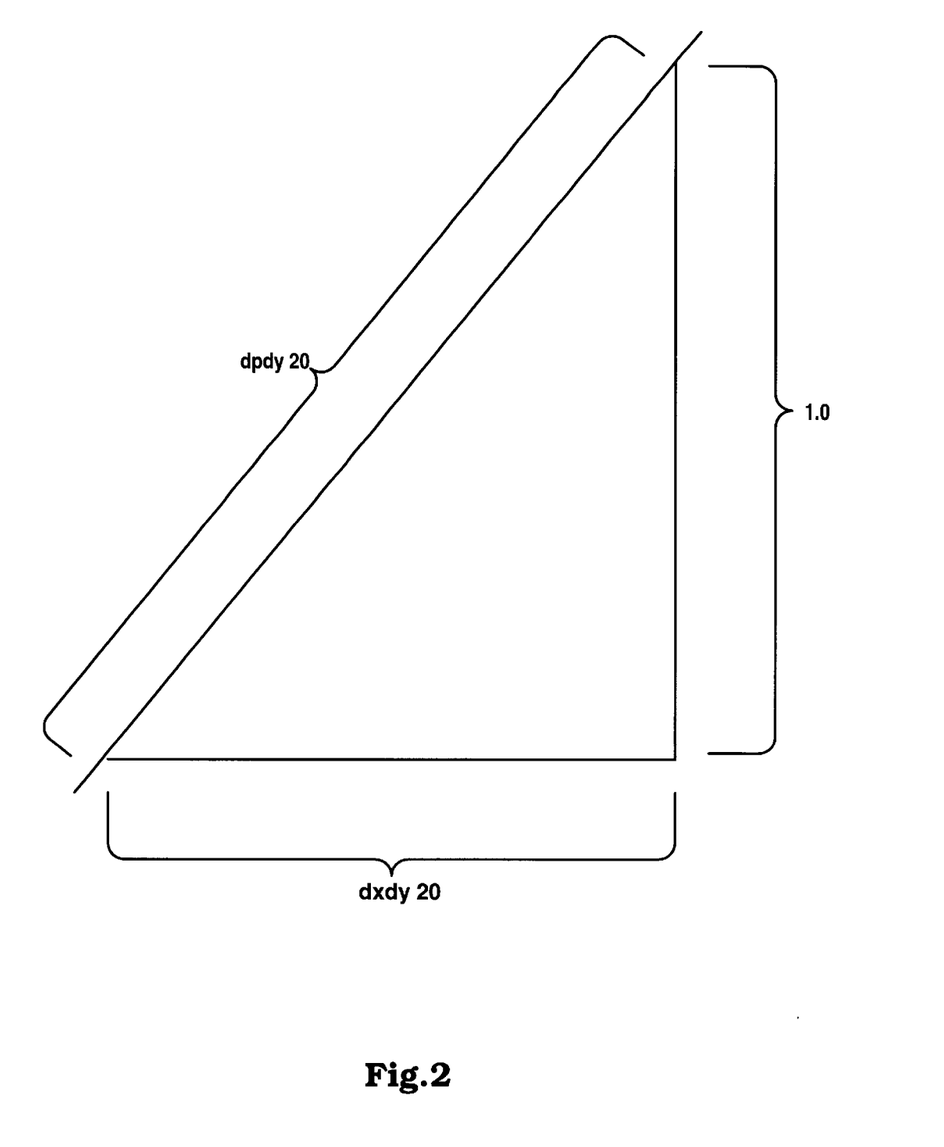
FIG. 2 illustrates a section of the triangle primitive shown in FIG. 1.

The setup computation in DDA is determined as follows:

1. Calculate parameter deltas dpdy for stepping down the vertical axis of the triangle (rather than calculating dpdy20 for stepping down the longest edge of the triangle). As shown in FIG. 2, dpdy20 represents one step down the long edge of the triangle for a distance of 1.0 in y. The value dxdy20 represents the change in X of the long edge for a distance of 1.0 in the y direction. This ratio of 1.0/dxdy20 is the slope of the edge. All of the dpdy20 values differ from the pure vertical dpdy by this slope.

Determine the slope (m20) of the longest edge.

$$dx20 = v2.v[PVERT\_X] - v0.v[PVERT\_X];$$

where $v2.v[PVERT\_X]$ is the x coordinate at vertex 2, and $v0.v[PVERT\_X]$ is the x coordinate at vertex 0.

$$dy20 = v2.v[PVERT\_Y] - v0.v[PVERT\_Y];$$

$$rdy20 = 1/dy20;$$

$$dxdy20 = dx20 * rdy20;$$

$$m20 = 1/dxdy20$$

Calculate the parameter delta dpdx for stepping across the horizontal axis.

Compute distance across the widest part of the triangle. Divide the distance by the number of steps (pixels).

Subtracting the slope ratio of the horizontal parameter component (dxdy20*dpdx) from the edge delta (dpdy20) produces the vertical delta values at a cost of one add and one multiply per parameter (rather than a multiply per parameter per scan line):

$$dpdy = dpdy20 - dxdy20 * dpdx$$

2. Compute the edge slopes of the two shorter edges for determining the triangle boundaries.

3. Calculate a base parameter value.

Figure 7:
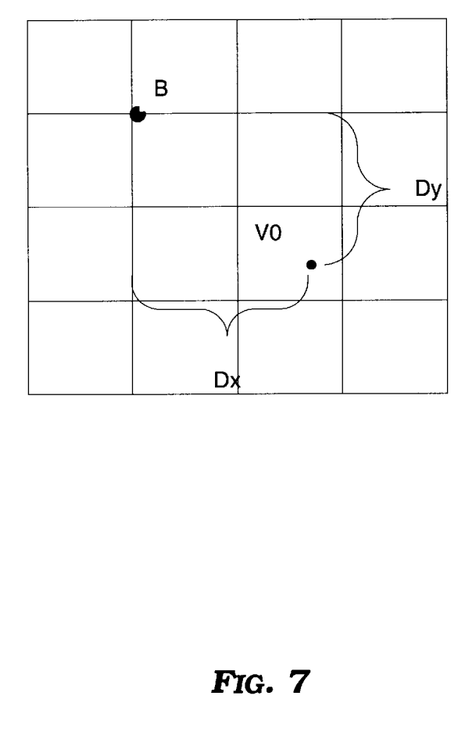
FIG. 7 illustrates computing a base parameter from the top vertex of a triangle primitive.

Find the tile comprising the top vertex, V0. As illustrated in FIG. 7, the parameters at V0 are then adjusted by the x coordinate distance and the y coordinate distance from V0 to the base position. The equation to determine the base parameter for a given parameter, p, is as follows:

$$pBase = p0 - Dx*dpdx - Dy*dpdy$$

All subsequent parameter value computations are available using simple additions of dpdx and dpdy, or two or four times those values.

Overview

Figure 3:
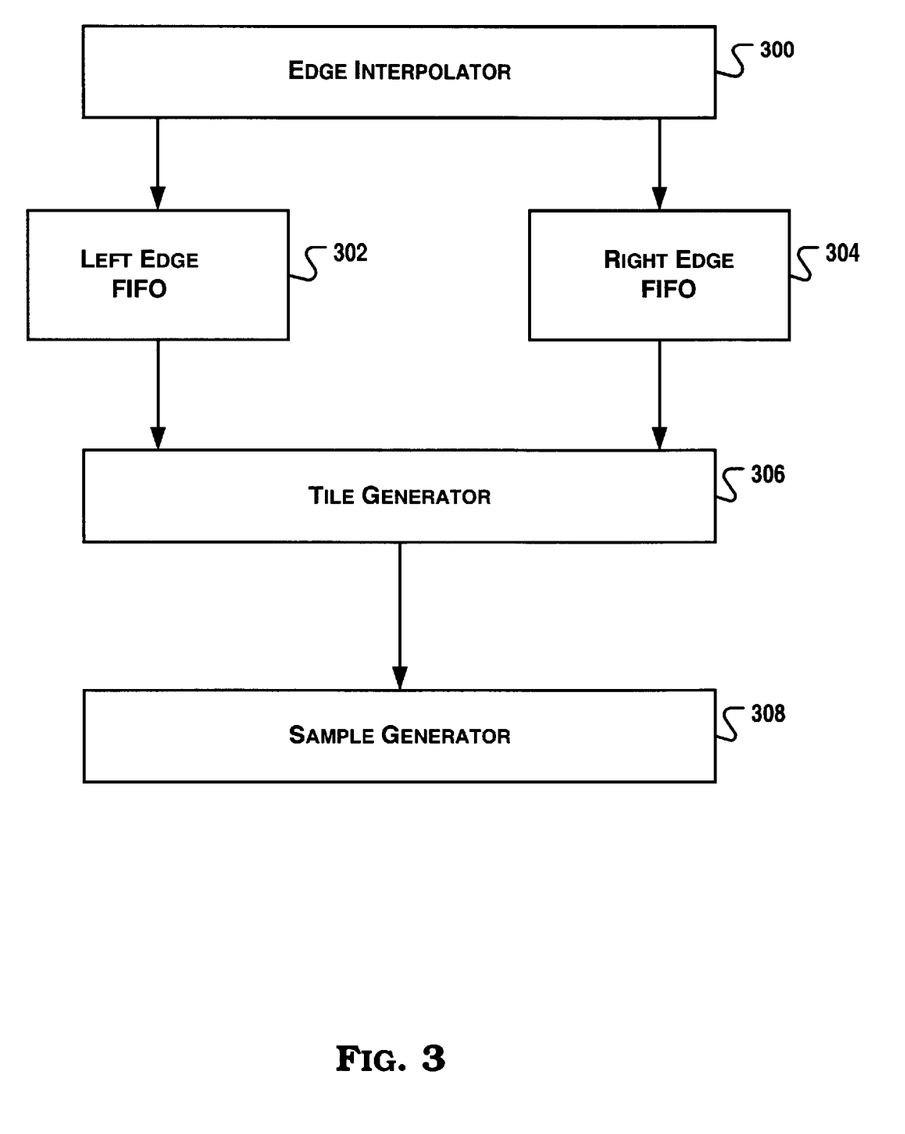
FIG. 3 shows components of tile-based DDA rasterization in preferred embodiments of the invention.

As shown in FIG. 3, an edge interpolator 300 determines the bounds of a triangle by storing leftmost points from each scan line in the Left Edge FIFO 302, and the rightmost points from each scan line in the Right Edge FIFO 304. Using these points, a tile generator 306 determines the leftmost tile and the rightmost tile to process from each scan line region, which in preferred embodiments is a region comprising four scan lines. A sample generator 308 then determines pixel values.

Figure 4:
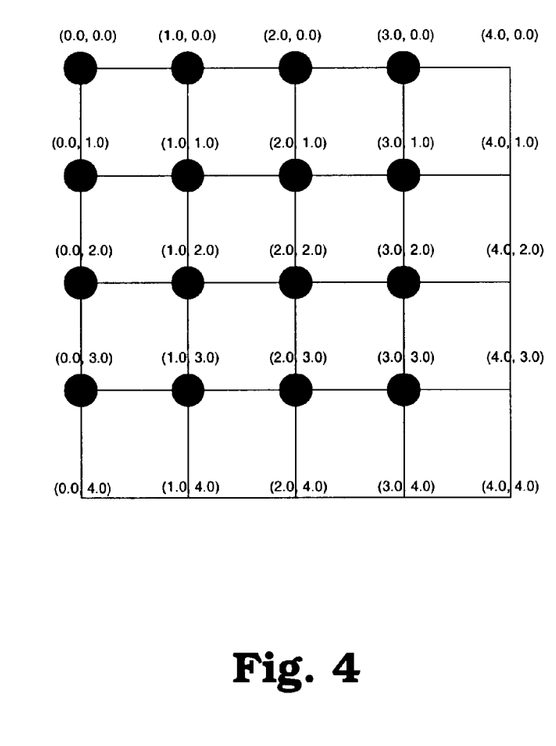
FIG. 4 shows one tile in a raster grid.

A triangle is rasterized in subsets of pixels called tiles. In preferred embodiments, a tile comprises a 4×4 block of 16 pixels. FIG. 4 illustrates a given tile in a raster, where the circles represent positions of valid sample points for pixels within the tile. In this illustration, a pixel is a valid sample point if the pixel's center falls on the (x.0, y.0) position of a grid, where x and y are integers. In other embodiments, however, the pixel center may fall on other positions of a grid (i.e., x.5, y.5) without departing from the scope of the invention. A sample value between 0.0 and 4.0, including 0.0, belongs to this tile—(0.0, 0.0), (1.0, 0.0), (2.0, 0.0), (3.0, 0.0), (0.0, 1.0), (1.0, 1.0), (2.0, 1.0), (3.0, 1.0), (0.0, 2.0), (1.0, 2.0), (2.0, 2.0), (3.0, 2.0), (0.0, 3.0), (1.0, 3.0), (2.0, 3.0), (3.0, 3.0)—, and a sample value of exactly 4.0 belongs to the next tile (0.0, 4.0), (1.0, 4.0), (2.0, 4.0), (3.0, 4.0), (4.0, 0.0), (4.0, 1.0), (4.0, 2.0), (4.0, 3.0), (4.0, 4.0).

Figure 5:
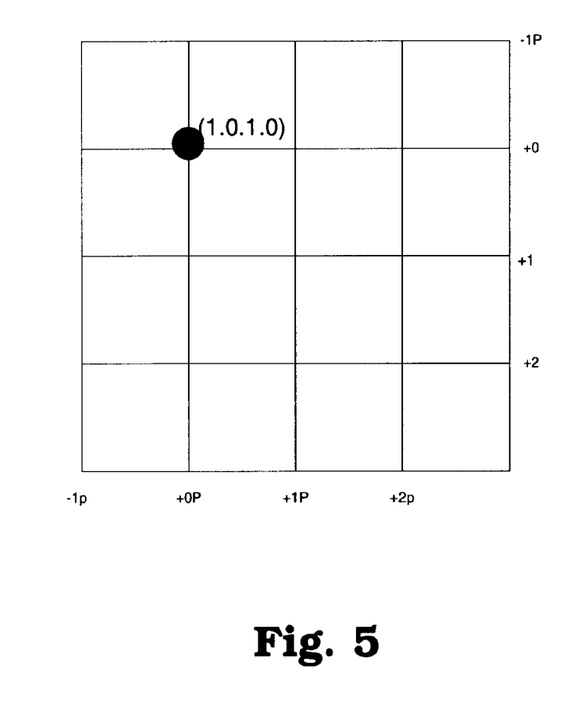
FIG. 5 shows a base pixel location within a tile.
Figure 6:
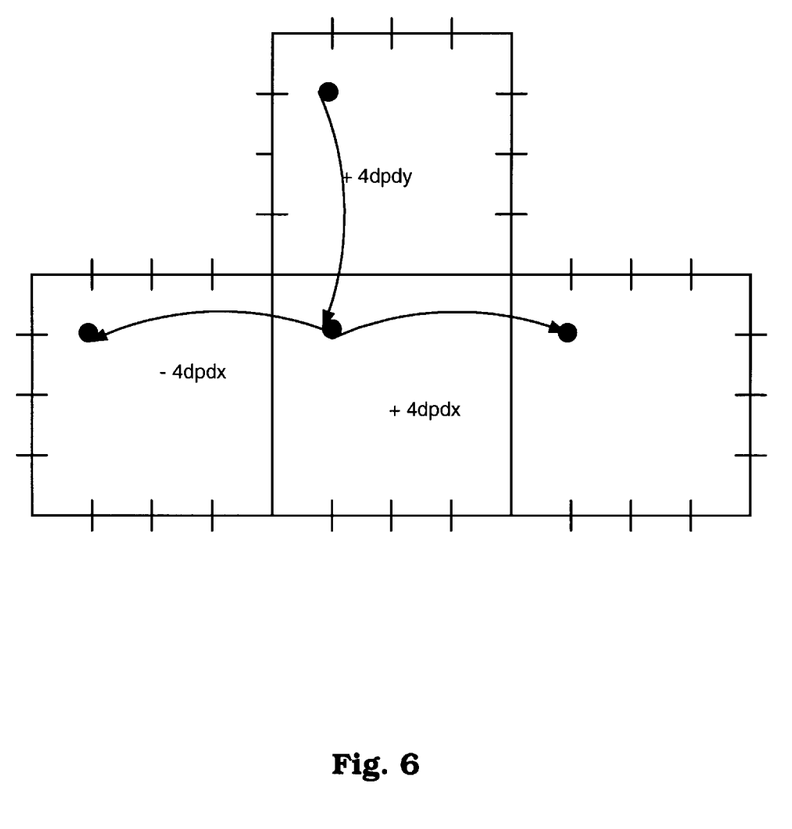
FIG. 6 shows movement between tiles in a raster grid.

Parameter values are computed at a base position within a tile as shown in FIG. 5. The base position is a position within a given tile from which other valid sample points may be computed by adding or subtracting the parameter delta. As shown in FIG. 6, to step from one tile to the next requires adding 4 times the dpdy base position to go down to a next tile, or adding or subtracting 4 times the dpdx base position to go left or right of a given tile. In preferred embodiments, the base position is the grid position (1.0, 1.0) within a tile.

Determining Triangle Boundaries

An edge interpolator steps down the triangle edges and stores the leftmost and rightmost x values into the Left Edge FIFO (First-In-First-Out) Unit and the Right Edge FIFO Unit for each step down the triangle edges. Each x value is obtained by adding or subtracting dxdy20. dxdy20 is the change in x for a step down the longest edge of the triangle. Consequently, we step across by dxdy20 in either direction until the bottom vertex V2 is reached.

LeftEdgeFIFO: V0→V2

This can be expressed in the following equation:

$x$store20=$x$current+$dxdy$20

LEFTEDGEFIFO($a$)=($int$)$x$store20+1;

or

LEFTEDGEFIFO($a$)=$int$($x$store20+1)

where a=an integer that represents the current scan line, or y value.

Starting at the scan line below the top vertex, step down the longest edge by adding dxdy20 to the current x value. Add the resulting x (xstore20) value to 1, and take the integer value of the resulting x (or take the integer value of the total of the resulting x+1). Store the result in the LeftEdgeFIFO. We stop once the current y value is greater than or equal to the y value of V2 (or once a predetermined count reaches a stop count, such as 0).

Figure 12:
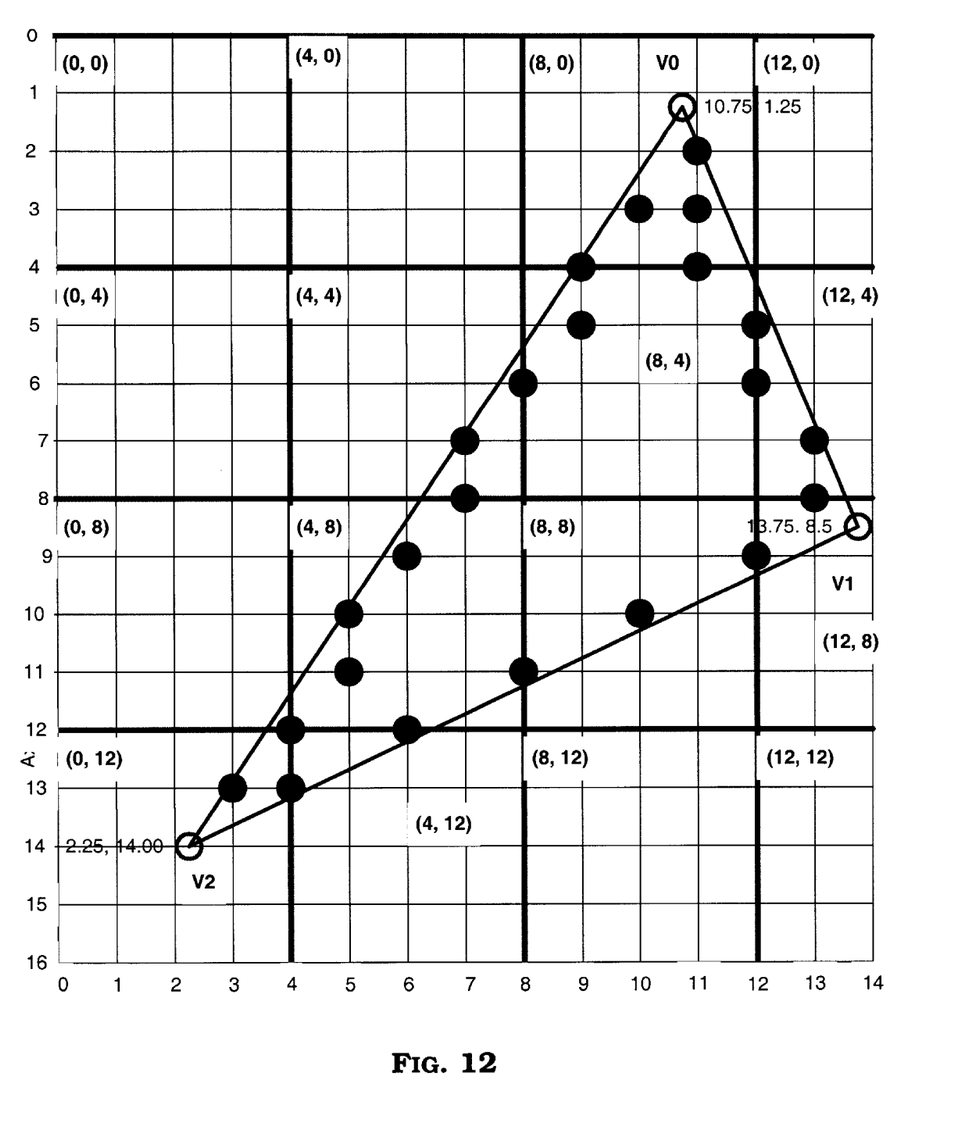
FIG. 12 is an example raster grid showing an interpolated triangle.

In reference to FIG. 12:

```
dxdy20 = dx20 * rdy20
    dx20  = v2.v[PVERT_X] - v0.v[PVERT_X]
          = 2.25 - 10.75
          = -8.5
    rdy20 = 1/dy20
        dy20  = v2.v[PVERT_Y] - v0.v[PVERT_Y]
              = 14.00 - 1.25
              = 12.75
          = 1/12.75
          = .08
       = -8.5 * .08
       = -.68
```

The Left Edge FIFO unit stores the leftmost x values for the edge defined by V0 to V2 as follows:

In this example, we start at scan line y=2, where x=10.25. We store x=11.

At y=3, we take 10.25 and add −0.68 and end up with x=9.57. We store x=10.

At y=4, we take 9.57 and add −0.68 and end up with x=8.89. We store x=9.

At y=5, we take 8.9 and add −0.68 and end up with x=8.21. We store x=9.

At y=6, we take 8.2 and add −0.68 and end up with x=7.53. We store x=8.

At y=7, we take 7.5 and add −0.68 and end up with x=6.85. We store x=7.

At y=8, we take 6.8 and add −0.68 and end up with x=6.17. We store x=7.

At y=9, we take 6.1 and add −0.68 and end up with x=5.49. We store x=6.

At y=10, we take 5.4 and add −0.68 and end up with x=4.81. We store x=5.

At y=11, we take 4.7 and add −0.68 and end up with x=4.13. We store x=5.

At y=12, we take 4.0 and add −0.68 and end up with x=3.45. We store x=4.

At y=13, we take 3.3 and add −0.68 and end up with x=2.77. We store x=3.

Since the current y=14.00 value is equal to v2.v[PVERT_Y]=14.00, we stop here.

RightEdgeFIFO: V0→V1

This can be expressed in the following equation:

$x$store10=$x$current+$dxdy$10

RIGHTEDGEFIFO10($a$)=($int$)$x$store10; or where a=an integer that represents the current scan line, or y value.

Starting at the scan line below the top vertex, step down the first shorter edge, V0 to V1, by adding dxdy10 to the current x value. Take the integer value of the resulting x, and store the result in the RightEdgeFIFO10 for the appropriate scan line. We stop once the current y value is greater than or equal to the y value of V1 (or once a predetermined count reaches a stop count, such as 0).

In reference to FIG. 12:

```
dxdy10 = dx10 * rdy10
    dx10  = v1.v[PVERT_X] - v0.v[PVERT_X]
          = 13.75 - 10.75
          = 3.0
    rdy10 = 1/dy10
        dy10  = v1.v[PVERT_Y] - v0.v[PVERT_Y]
              = 8.5 - 1.25
              = 7.25
          = 1/7.25
          = .14
       = 3.0 * .14
       = .42
```

The Right Edge FIFO unit stores the rightmost x values for the edge defined by V0 to V1 as follows:

In this example, we start at scan line y=2, where x=11.065. We store x=11.

At y=3, we take 11 and add 0.42 and end up with x=11.42. We store x=11.

At y=4, we take 9.57 and add 0.42 and end up with x=11.84. We store x=11.

At y=5, we take 8.9 and add 0.42 and end up with x=12.26. We store x=12.

At y=6, we take 9.57 and add 0.42 and end up with x=12.68. We store x=12.

At y=7, we take 9.57 and add 0.42 and end up with x=13.10. We store x=13.

At y=8, we take 9.57 and add 0.42 and end up with x=13.52. We store x=13.

Since the current y=9 value is greater than v1.v[PVERT_Y]=8.5, we stop here.

RightEdgeFiFO: V1→V2

This can be expressed in the following equation:

$x$store12=$x$current+$dxdy$10

RIGHTEDGEFIFO12($a$)=($int$)$x$store12; or where a=an integer that represents the current scan line, or y value.

Starting at the scan line below the top vertex, step down the second shorter edge, V1 to V2, by adding dxdy12 to the current x value. Take the integer value of the resulting x, and store the result in the RightEdgeFIFO12. We stop once the current y value is greater than or equal to the y value of V2 (or once a predetermined count reaches a stop count, such as 0).

In our example:

```
dxdy12 = dx12 * rdy12
    dx12  = v2.v[PVERT_X] - v1.v[PVERT_X]
          = 2.25 - 13.75
          = -11.5
    rdy12 = 1/dy12
        dy12 = v1.v[PVERT_Y] - v2.v[PVERT_Y]
             = 14.00 - 8.5
             = 5.5
        = 1/5.5
        = .1818
    = -11.5 * .1818
    = -2.09
```

The Right Edge FIFO unit stores the rightmost x values for the edge defined by V2 to V1 as follows:

In this example, we start at scan line y=9, where x=12.705. We store x=12.

At y=10, we take 12.75 and add −2.3 and end up with x=10.66. We store x=10.

At y=11, we take 10.66 and add −2.3 and end up with x=8.57. We store x=8.

At y=12, we take 8.57 and add −2.3 and end up with x=6.48. We store x=6.

At y=13, we take 6.48 and add −2.3 and end up with x=4.39. We store x=4.

Since the current y=14.00 value is equal to v1.v[PVERT_Y]=14.00, we stop here.

These coordinates all correspond to the black dots on FIG. 12.

For each four line scan region (i.e., in FIG. 12, lines 0, 1, 2, 3; lines 4, 5, 6, 7, etc. on the y axis), a leftmost tile to be accessed for that region and a rightmost tile to be accessed for that region is determined by the tile generator.

For the left edge, a positive edge slope (x increases as we move down the edge) indicates that the top scan line contains the leftmost valid sample, and a negative edge slope (x decreases as we move down the edge) indicates that the bottom scan line contains the leftmost valid sample.

For the right edge, a positive edge slope (x increases as we move down the edge) indicates that the bottom scan line contains the rightmost valid sample, and a negative edge slope (x decreases as we move down the edge) indicates that the top scan line contains the rightmost valid sample.

For the four-line region comprising the middle vertex, the same rules above apply if both edges have positive slopes or both edges have negative slopes. However, if one edge has a positive slope, and the other edge has a negative slope, then the middle vertex itself is the rightmost or the leftmost point.

Any tiles that exist to the left of the leftmost tile in a four scan line region are not visited, and any tiles that exist to the right of the rightmost tile in a four scan line region are not visited.

Tile Generation

Since the first tile base position may not always comprise the top-most vertex, we start at the base position of the tile comprising the top-most vertex to save processing time. To begin rasterizing the triangle, a tile generation unit starts interpolating values from the base parameter values in the tile containing the top-most vertex.

Finding The Top-Most Vertex

The tile comprising the top vertex is determined by taking the integer value of the vertex coordinates, and zeroing out the two low order bits of the binary x and y value. In the example of FIG. 12, the top vertex comprises (10.75, 1.25). We take the integer value to obtain (10.00, 1.00), which is represented as (1010, 0001) in binary. We then zero out the two low order bits to obtain (1000, 0000), which is (8, 0) in decimal. We will call this tile T(8, 0).

Starting at tile T(8,0), all valid pixel samples within the tile can be determined first, and then their values computed. In this embodiment, it is preferable that 8 sample values are computed per cycle for a rate of 2 cycles per tile, and then the valid pixels from the 8 computed values are selected. Alternatively, and preferably, all valid pixels are determined first, and then their values computed.

In preferred embodiments, therefore, we first find the valid pixel samples by retrieving the leftmost x value and a rightmost x value for each scan line, which are both valid pixel samples, and then interpolating values for those samples, as well as samples in between, for filling the triangle a tile at a time, based on the base position (1.0, 1.0) within a tile.

Since the values for the base parameters have already been determined previously during setup, it is just a matter of adding or subtracting dpdx and dpdy values to determine the value of one pixel to another. In other words, determining the value of the next pixel merely requires adding dpdy if the next pixel is below, or subtracting dpdy if the next pixel is above. Likewise, determining values from one pixel to a left pixel is calculated by subtracting dpdx, and determining values from one pixel to a right pixel is calculated by adding dpdx.

Figure 8:
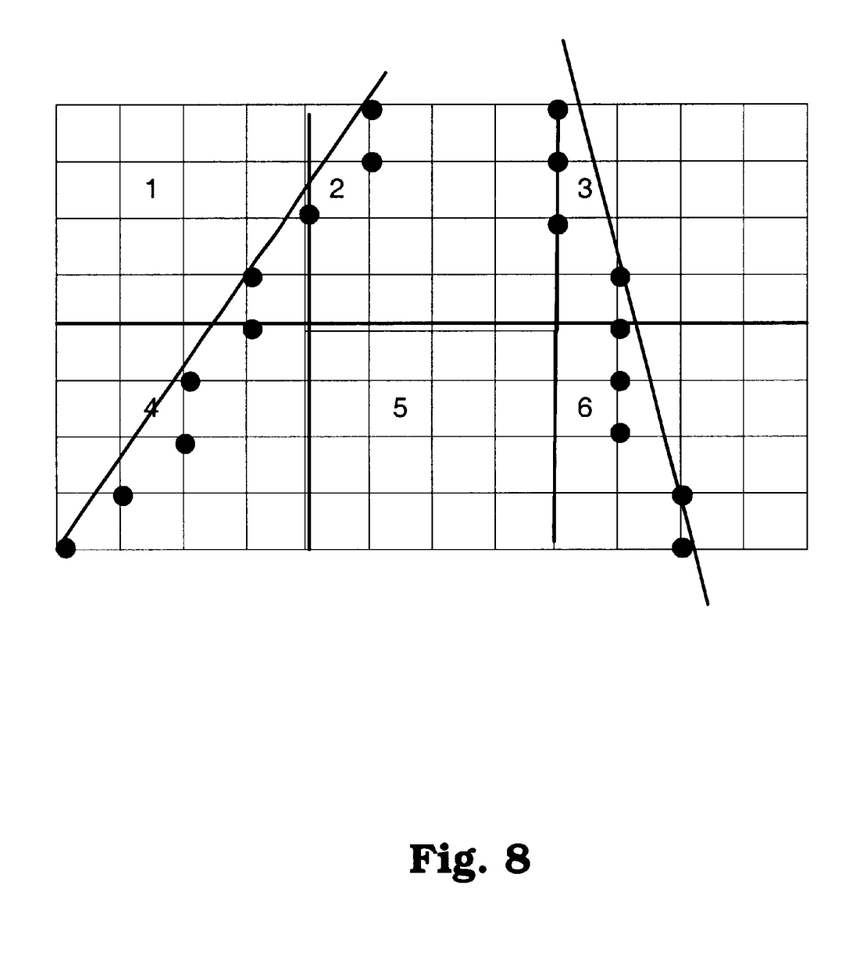
FIG. 8 illustrates edge interpolation.

FIG. 7 illustrates the base position B in relation to the top vertex, V0. FIG. 8 illustrates edge interpolation using valid pixel samples within tiles.

Tile Comprising The Top-Most Vertex

For the scan line region comprising the top-most vertex, we determine a leftmost tile and a rightmost tile so that we can process one tile at a time. To determine a leftmost tile in the region, x values for scan lines 2 and 3 for the longest edge are analyzed:

at y=2, x=10.25 at y=3, x=9.5

Using the rules described above, since x decreases as we move down the edge, the bottom scan line (y=3) contains the leftmost valid sample. We obtain the coordinates at scan line 3 from the left edge FIFO, which are (10, 3), and we determine the tile it is in. Using the method described, supra, we find that it is in tile T(8, 0).

To determine a rightmost tile in the region, x values for scan lines 2 and 3 for the first shortest edge are determined:

at y=2, x=10.75 at y=3, x=11.5

For the right edge, since x increases as we move down the edge, the bottom scan line contains the rightmost valid sample. We obtain the coordinates at scan line 3 from the left edge FIFO, which are (11, 3), and we determine the tile it is in. Using the method described, supra, we find that it is also in tile T(8,0).

Since the leftmost tile and the rightmost tile are the same, we process tile T(8, 0) as follows. As LEFTEDGEFIFO(2) (i.e., the x value at y=2) is equal to 11, and RIGHTEDGEFIFO(2) is equal to 11, there is only one valid sample for scan line=y=2. Using the two low order bits of the integer pixel address in x and y, the raster coordinates (11, 2) are calculated to be equal to the grid position (3.0, 2.0).

Using pixel values from the base position of the tile comprising the top-most vertex (1.0, 1.0), we determine the pixel values for the grid position (3.0, 2.0) as follows:

(1.0, 1.0): GIVEN
(3.0, 2.0): add (2dpdx, dpdy)

Next, the scan line is incremented by 1, so that y=3. LEFTEDGEFIFO(3) is equal to 10, and RIGHTEDGEFIFO(3) is equal to 11, and there are 2 valid samples for this scan line. The raster coordinates (10, 3) are equal to the grid position (2.0, 3.0). Using pixel values from the base position (1.0, 1.0), we determine the pixel values for the grid position (2.0, 3.0) as follows:

(1.0, 1.0): GIVEN
(2.0, 3.0): add (dpdx, 2dpdy)

The raster coordinates (11, 3) are equal to the grid position (3.0, 3.0) Using pixel values from the base position (1.0, 1.0), we determine the pixel values for the grid position (3.0, 3.0) as follows:

(1.0, 1.0): GIVEN
(3.0, 3.0): add (2dpdx, 2dpdy)

Steering to the Next Tile

To steer to, or find, the next tile to process, we determine a leftmost tile and a rightmost tile for the next scan line region, which in our example comprises scan lines 4–7. Using a method, such as that described above, we determine that the bottom scan line, y=7 comprises both the leftmost and the rightmost tile. At y=7, we obtain the x value from the left edge FIFO, which gives us the coordinates (7, 7). Using a method such as that described above, we determine that (7, 7) belongs to tile T(4, 4), and that tile T(4, 4) is the leftmost tile. We then obtain the x value from the right edge FIFO, which gives us the coordinates (13, 7). We then find that this coordinate belongs to tile T(12, 4), and that tile T(12, 4) is the rightmost tile.

Processing proceeds at the tile comprising the next scan line, and then progresses to the left and/or to the right in accordance with the leftmost tile and rightmost tile. The next scan line is y=4, where the coordinates are (9, 4), and the tile is T(8, 4). At the left edge FIFO, x=9, and at the right edge FIFO, x=11, so valid pixel samples comprise x={9, 10, 11}. For each valid pixel, we compute the pixel value as follows.

To find the pixel values for the base position in this tile (we only know the base position pixel values for the tile comprising the top-most vertex), we make calculations based on the tile comprising the top-most vertex, T(8, 0). To get from tile T(8, 0) to tile T(8, 4), we use the dpdx pixel value at position (1.0, 1.0) in tile T(8, 0) (since the x tile position is the same), and we multiply the dpdy pixel value at position (1.0, 1.0) in tile T(8, 0) by 4 (since the current tile is 4x values more than the y value of the top-most vertex) to obtain the y pixel value. Using pixel values from the base position (1.0, 1.0) for the current tile, we determine the pixel values for:

The raster coordinate (9, 4) having the grid position (1.0, 0.0), where 4 represents scan line 4 (y=4), and 9 is the leftmost position on this scan line.

(1.0, 1.0): GIVEN
(1.0, 0.0): add (0, -dpdy)

The raster coordinate (10, 4) having the grid position (2.0, 0.0), where 4 represents scan line 4 (y=4), and 10 is the next valid pixel sample on this scan line.

(1.0, 1.0): GIVEN
(2.0, 0.0): add (dpdx, -dpdy)

The raster coordinate (11, 4) having the grid position (3.0, 0.0), where 4 represents scan line 4 (y=4), and 11 is the rightmost position on this scan line.

(1.0, 1.0): GIVEN
(3.0, 0.0): add (2dpdx, -dpdy)

Next, the scan line is incremented by 1, so that y=5. At scan line 5 in tile T(8, 4), valid samples comprise x={9, 10, 11}, and at scan line 6 in tile T(8, 4), valid samples comprise x={8, 9, 10, 11}. The scan lines are rasterized as described above.

To steer to the next tile from tile T(8, 4), we subtract 4 from the x value of the tile to get tile T(4, 4). Since we know that tile T(4, 4) is the leftmost tile, we stop here after we obtain the pixel values. To steer to the next tile from T(8, 4), we add 4 from the x value of the tile to get tile T(12, 4). Since we know this is the rightmost tile, we stop here after we obtain the pixel values. We steer to subsequent tiles until all the values in the FIFO's have been visited.

Figure 9:
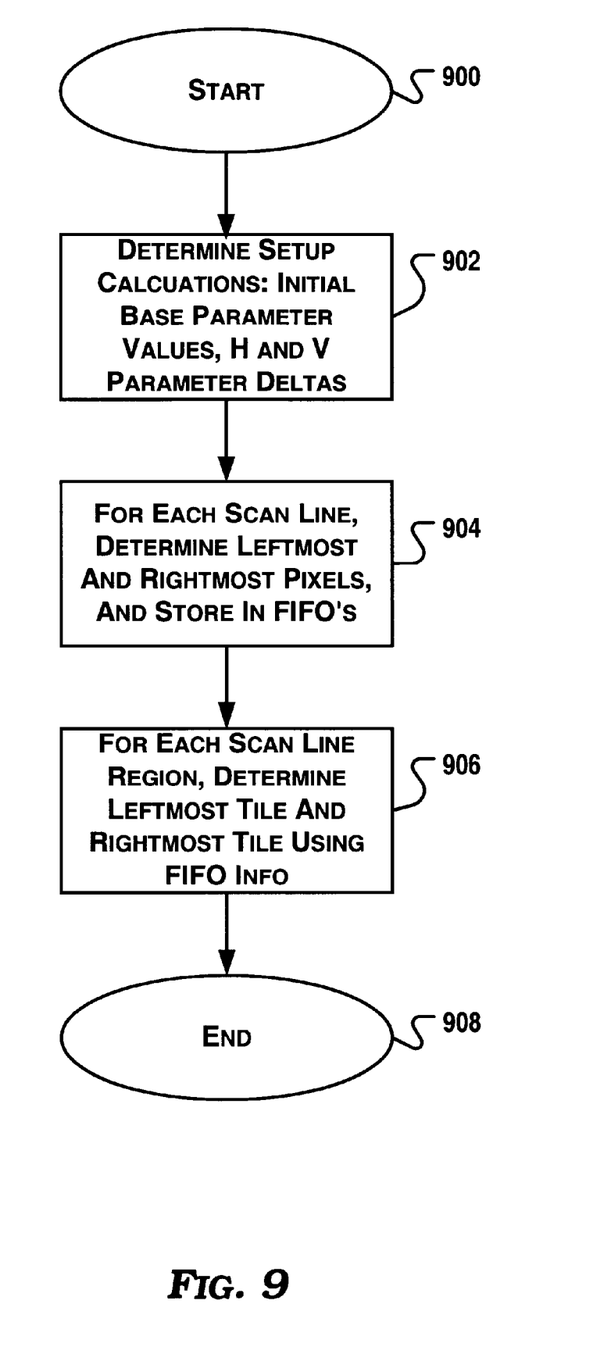
FIG. 9 is a flowchart illustrating a method to determine triangle boundaries.

FIG. 9 is a flowchart illustrating a method to determine triangle boundaries in accordance with general embodiments of the invention. The method begins at block 900, and continues to block 902 where setup calculations, including a vertical parameter value delta, a horizontal parameter value delta, and initial base parameter values (base parameter values at tile containing topmost vertex) are determined. At block 904, the leftmost and rightmost pixels for each scan line are determined, and stored in appropriate FIFO's. At block 906, the leftmost tile and rightmost tile for each scan line region are determined using the FIFO information. The method ends at block 908.

Figure 10:
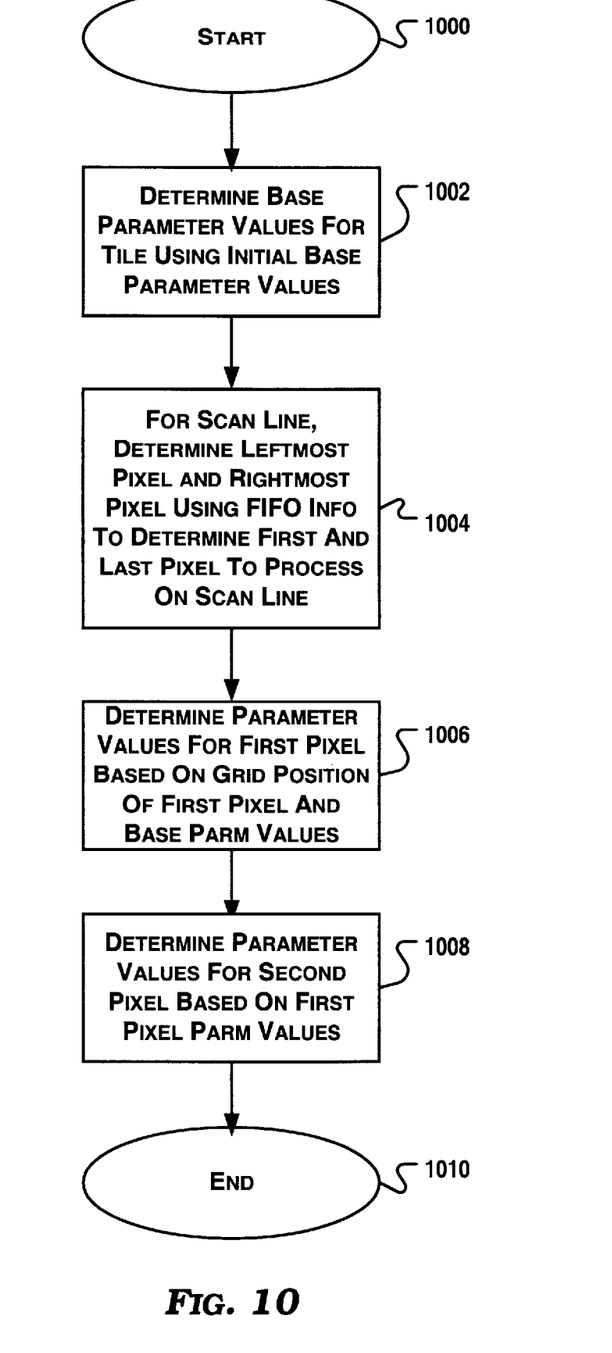
FIG. 10 is a flowchart illustrating a method to compute pixel parameter values.

FIG. 10 is a flowchart illustrating a method to compute pixel parameter values for a scan line within a tile in accordance with general embodiments of the invention. The method begins at block 1000, and continues to block 1002 where the base parameter values for the tile are determined based on the initial base parameter values and tile positions. At block 1004, the leftmost pixel and rightmost pixel for the scan line are determined using the FIFO's. This determines the first and last pixels to process on the scan line. At block 1006, parameter values for a first pixel are determined based on the grid position of the first pixel, and on the base parameter values for the tile. At block 1008, parameter values for a second pixel are determined based on the parameter values for the first pixel. The method ends at block 1010.

Figure 11:
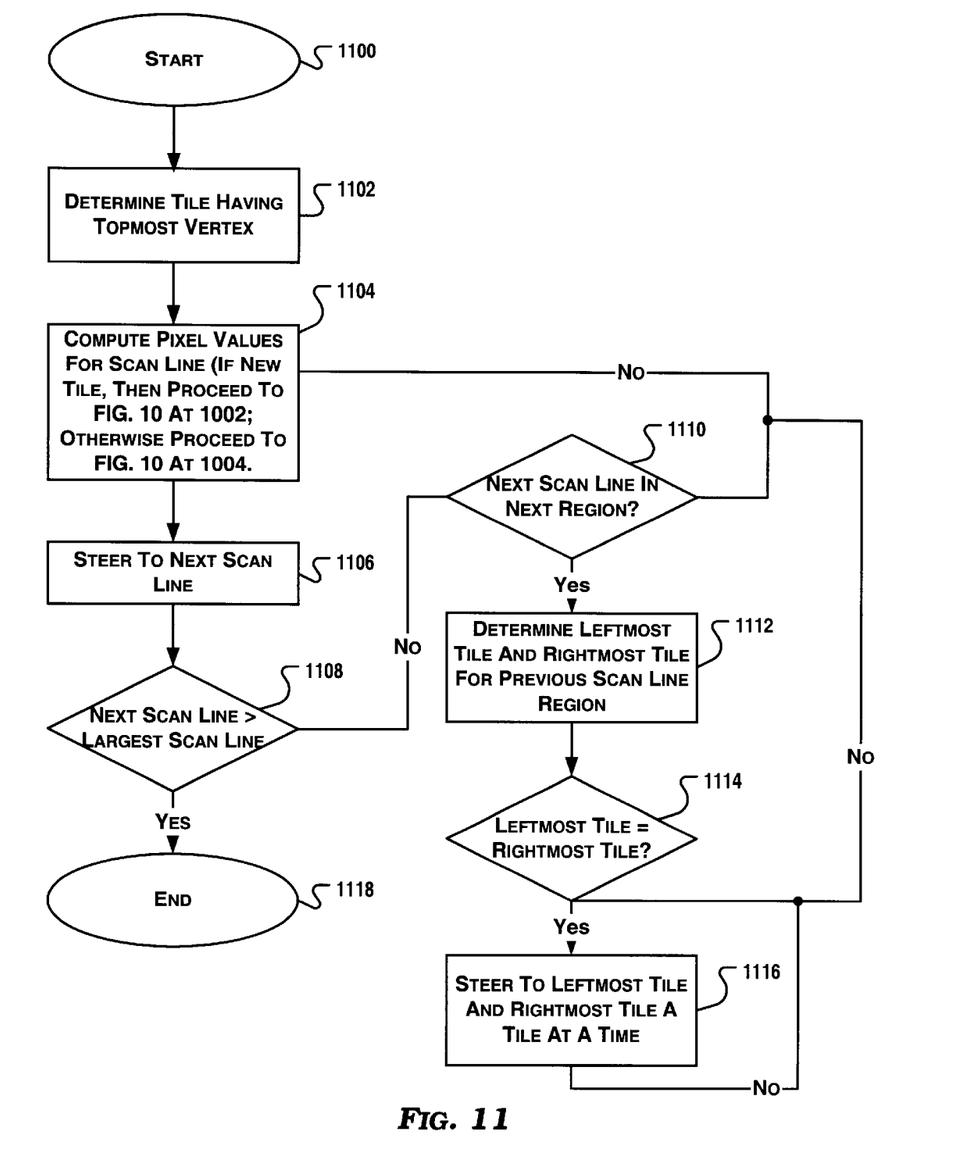
FIG. 11 is a flowchart illustrating a method to rasterize a triangle.

FIG. 11 is a flowchart illustrating a method to rasterize a triangle. The method begins at block 1100, and continues to block 1102 where the tile containing the topmost vertex is determined. At block 1104, the tile is rasterized by computing pixel values for a scan line in the tile as illustrated in FIG. 10 (if this is a new tile to visit, then start at block 1002, otherwise start at block 1004). At block 1106, steer to the next scan line.

At block 1108, it is determined if the next scan line is less than or equal to the largest scan line. If so, then at block 1110, it is determined if the next scan line is in the next scan line region. If the next scan line is in the next scan line region, then at block 1112, determine the leftmost tile and rightmost tile for the previous scan line region using the FIFO information. If at block 1114 it is determined if the leftmost and rightmost tile for the previous scan line region are the same, then proceed at block 1104.

If it is determined at block 1108 that the next scan line is greater than the largest scan line, then the method ends at block 1118. If at block 1110 it is determined that the next scan line is not in the next scan line region, then processing proceeds at block 1104. If at block 1114 it is determined that the leftmost tile and rightmost tile are not the same, then at block 1116, steer to the next block in left and right directions until both the leftmost and rightmost tiles are processed. From block 1116, process each tile at block 1104.

Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, calculations shown in throughout the description are exemplary. There may be other ways of computing the variables needed, other than those shown, which are well-known to one skilled in the art.

What is claimed is:

1. A method, comprising:
   a. for each scan line in a raster:
      storing leftmost pixels of a primitive to be rasterized in a first FIFO (first-in-first-out); and
      storing rightmost pixels of the primitive in a second FIFO;
   b. determining leftmost tiles and rightmost tiles for each scan line region based on the leftmost pixels and the rightmost pixels, each tile including a grid of pixels;
   c. starting at a tile having a topmost vertex of the primitive, processing a given tile by:
      i) interpolating a first pixel parameter value on a given scan line within the given tile based on a base parameter value for the given tile, the base parameter value being based on an initial base parameter value corresponding to a base parameter value in the tile having the topmost vertex; and
      ii) interpolating any subsequent pixel parameter values for the given scan line in the given tile based on the pixel parameter value for a previous horizontal axis value;
   d. steering to a number of next tiles to the left of the given tile, and to the right of the given tile, and processing each next tile until the leftmost tile and the rightmost tile in the given scan line region has each been processed;
   e. steering to a next tile in a next scan line region from the given tile; and
   f. repeating c(i)–f until the adjacent tile does not have any valid pixels.

2. The method of claim 1, wherein the raster is defined by a horizontal axis and a vertical axis, each tile within the raster is defined by a horizontal axis and a vertical axis, and each tile is identified by a two-dimensional coordinate.

3. The method of claim 2, wherein said interpolating any subsequent pixel parameter values for the given scan line in the given tile based on the pixel parameter value for a previous horizontal axis value comprises determining if a pixel falls within the given tile by:
   determining raster coordinates for a pixel to be interpolated, the raster coordinates being decimal values;
   converting the decimal values of the raster coordinates into decimal, integer values;
   converting the decimal, integer values into a binary value, the binary values having two low order bits;
   zeroing out the two low order bits of the binary values;
   converting the zeroed out binary values into decimal values, the converted decimal values corresponding to the two dimensional coordinate associated with a determined tile; and
   if the determined tile matches the given tile, then determining that the pixel falls within the given tile.

4. The method of claim 2, wherein the raster includes a horizontal axis that increases in value from left to right, and a vertical axis that increases in value from top to bottom, each tile within the raster includes a horizontal axis that increases in value from left to right, and a vertical axis that increases from top to bottom, and each tile being identified by a two-dimensional coordinate that increases from left to right on the horizontal axis, and increases from top to bottom on the vertical axis.

5. The method of claim 1, wherein the next tile comprises a tile below the given tile.

6. A machine-readable medium having stored thereon data representing sequences of instructions, the sequences of instructions which, when executed by a processor, cause the processor to perform the following:
   a. for each scan line in a raster:
      store leftmost pixels of a primitive to be rasterized in a first FIFO (first-in-first-out); and
      store rightmost pixels of the primitive in a second FIFO;
   b. determine leftmost tiles and rightmost tiles for each scan line region based on the leftmost pixels and the rightmost pixels, each tile including a grid of pixels;
   c. starting at a tile having a topmost vertex of the primitive, process a given tile by:
      i) interpolating a first pixel parameter value on a given scan line within the given tile based on a base parameter value for the given tile, the base parameter value being based on an initial base parameter value corresponding to a base parameter value in the tile having the topmost vertex; and
      ii) interpolating any subsequent pixel parameter values for the given scan line in the given tile based on the pixel parameter value for a previous horizontal axis value;
   d. steer to a number of next tiles to the left of the given tile, and to the right of the given tile, and processing each next tile until the leftmost tile and the rightmost tile in the given scan line region has each been processed;
   e. steer to a next tile in a next scan line region from the given tile; and
   f. repeat c(i)–f until the adjacent tile does not have any valid pixels.

7. The machine-readable medium of claim 6, wherein the raster is defined by a horizontal axis and a vertical axis, each tile within the raster is defined by a horizontal axis and a vertical axis, and each tile is identified by a two-dimensional coordinate.

8. The machine-readable medium of claim 7, wherein the processor interpolates any subsequent pixel parameter values for the given scan line in the given tile based on the pixel parameter value for a previous horizontal axis value by:
   determining raster coordinates for a pixel to be interpolated, the raster coordinates being decimal values;
   converting the decimal values of the raster coordinates into decimal, integer values;
   converting the decimal, integer values into a binary value, the binary values having two low order bits;
   zeroing out the two low order bits of the binary values;
   converting the zeroed out binary values into decimal values, the converted decimal values corresponding to the two dimensional coordinate associated with a determined tile; and
   if the determined tile matches the given tile, then determining that the pixel falls within the given tile.

9. The machine-readable medium of claim 7, wherein the raster includes a horizontal axis that increases in value from left to right, and a vertical axis that increases in value from top to bottom, each tile within the raster includes a horizontal axis that increases in value from left to right, and a vertical axis that increases from top to bottom, and each tile being identified by a two-dimensional coordinate that increases from left to right on the horizontal axis, and increases from top to bottom on the vertical axis.

10. The machine-readable medium of claim 6, wherein the next tile comprises a tile below the given tile.

* * * * *